US009262259B2

(12) United States Patent
Ashkenazi (10) Patent No.: US 9,262,259 B2
(45) Date of Patent: Feb. 16, 2016

(54) ONE-TIME PROGRAMMABLE INTEGRATED CIRCUIT SECURITY (71) Applicant: QUALCOMM Incorporated, San Diego, CA (US)

(72) Inventor: Asaf Ashkenazi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 13/741,248

(22) Filed: Jan. 14, 2013

(65) Prior Publication Data
US 2014/0201607 A1 Jul. 17, 2014

(51) Int. Cl.
G06F 21/78 (2013.01)
G06F 11/08 (2006.01)
G06F 21/71 (2013.01)
H04L 9/00 (2006.01)

(52) U.S. Cl.
CPC .............. G06F 11/08 (2013.01); G06F 21/71 (2013.01); G06F 21/78 (2013.01); H04L 9/004 (2013.01)

(58) Field of Classification Search
CPC .... G11C 17/16; G11C 2216/26; H04L 9/004; G06F 21/00; G06F 21/60; G06F 21/602; G06F 21/604; G06F 21/62; G06F 21/6209; G06F 21/6218; G06F 21/6245; G06F 21/64; G06F 21/70; G06F 21/78; G06F 21/79; G06F 21/80
USPC ........ 714/819; 726/26, 27, 30, 34, 22, 23, 25, 726/2, 21; 713/189, 193, 194; 365/94–105
See application file for complete search history.

(56) References Cited

U.S. PATENT DOCUMENTS

| 6,856,531 | B2 | 2/2005 | Turner et al. | |
|---|---|---|---|---|
| 6,944,083 | B2 * | 9/2005 | Pedlow, Jr. | ................. 365/225.7 |
| 7,085,979 | B2 | 8/2006 | Kim et al. | |
| 7,398,554 | B1 * | 7/2008 | Falik et al. | ..................... 726/23 |
| 7,818,569 | B2 | 10/2010 | Devadas et al. | |
| 7,818,584 | B1 | 10/2010 | Joyce et al. | |
| 7,917,788 | B2 | 3/2011 | May | |
| 8,046,571 | B1 | 10/2011 | Feng et al. | |

(Continued)

FOREIGN PATENT DOCUMENTS

TW  201214104 A  4/2012
TW  201229761 A  7/2012

OTHER PUBLICATIONS

International Search Report and Written Opinion—PCT/US2014/011412—ISA/EPO—Apr. 4, 2014.

(Continued)

Primary Examiner — Albert Decady
Assistant Examiner — Christian Dorman
(74) Attorney, Agent, or Firm — Michelle S. Gallardo (57) ABSTRACT One-time programmable integrated circuit security is described. An example of a method of protecting memory assets in an integrated circuit includes sampling values of multiple OTP memory arrays and comparing the sampled value of each OTP memory array with the sampled value of each other OTP memory array and with an unprogrammed OTP memory array value. The method further includes determining if an integrated circuit performance fault has occurred based on the compared sampled values, booting the integrated circuit, and operating the integrated circuit with access to memory determined by the fault occurrence determination.

40 Claims, 3 Drawing Sheets (56) References Cited

U.S. PATENT DOCUMENTS

| | | |
|---|---|---|
| 2006/0092742 A1 | 5/2006 | Paillet et al. |
| 2008/0086781 A1 | 4/2008 | Rodgers |
| 2008/0201592 A1 | 8/2008 | Lawrence et al. |
| 2009/0316466 A1 | 12/2009 | Xu et al. |
| 2010/0189262 A1 | 7/2010 | Ducharme et al. |
| 2010/0244888 A1 | 9/2010 | Tkacik et al. |
| 2011/0010720 A1 | 1/2011 | Smith et al. |
| 2011/0066878 A1* | 3/2011 | Hosono et al. ............ 714/6.1 |
| 2012/0033490 A1 | 2/2012 | Rao |
| 2012/0079287 A1 | 3/2012 | Leclercq |
| 2012/0110659 A1 | 5/2012 | Brokish et al. |
| 2012/0166781 A1 | 6/2012 | De Cesare et al. |
| 2014/0140162 A1* | 5/2014 | Kim et al. ............ 365/230.01 |

OTHER PUBLICATIONS

Bar-El, et al., "The Sorcerer's Apprentice Guide to Fault Attacks," Proceedings of the IEEE, vol. 94, Issue 2, 2006, pp. 370-382.

Skorobogatov, Sergei, "Fault attacks on secure chips: from glitch to flash," Design and Security of Cryptographic Algorithms and Devices (ECRYPT II) Albena, Bulgaria, May 29-Jun. 3, 2011, pp. 1-64.

Skorobogatov, Sergei, "Physical Attacks on Tamper Resistance: Progress and Lessons," Physical Attacks on Tamper Resistance: Progress and Lessons 2nd ARO Special Workshop on HW Assurance, Washington DC, Apr. 11-12, 2011, pp. 1-37.

Taiwan Search Report—TW103101294—TIPO—Mar. 23, 2015.

* cited by examiner

ONE-TIME PROGRAMMABLE INTEGRATED CIRCUIT SECURITY

BACKGROUND

Electronic systems that include an integrated circuit (IC) often utilize secure memory, for example secure random access memory (RAM), of the IC to store provisioned data that a user desires or needs keep secret and protect from hacker attacks. In general, provisioned data can be any data stored in IC memory after manufacturing. The provisioned data stored in secure memory can include, for example but not limited to, codes, keys, passwords, account information, personal information, proprietary information, and contact information. Exemplary electronic systems, or end devices, include set-top boxes, personal computers, laptop computers, hand-held devices, tablets, and modems. Such provisioned data stored in secure memory can be vulnerable to hacker attacks designed to gain unauthorized access to the secure memory. In order to protect the provisioned data in secure memory, ICs, which can include system-on-chip (SoC) ICs, can incorporate a security system which can utilize hardware embedded security sequences to determine whether or not the IC has been the subject of a hacker attack. If the IC has been attacked, the security system can enable the IC to block or limit access to secure memory and the provisioned data stored therein.

Hardware embedded security sequences can be implemented using one-time programmable (OTP) memory. OTP memory includes at least one OTP memory device and any associated electronic circuitry, including but not limited to sampling and capturing circuitry to sample and capture the programmed state of the programmable device. Multiple OTP memory devices and associated electronic circuitry constitute an OTP memory array. An OTP memory device may be programmed one time and may not be reprogrammed. Examples of OTP memory devices are fuses and anti-fuses.

In an exemplary fuse OTP memory array, each fuse device in the array can exist in one of two states. In an initial unprogrammed state, a fuse device can function as a line of electrical connection permitting conduction of current. Upon application of a programming voltage or current, each fuse device can be converted to a programmed state in which the fuse device can function as an open circuit limiting conduction of current through the fuse. The programming voltage or current depends on the device constituting the fuse. For example, if the fuse is formed by a transistor, then the programming voltage can be a voltage slightly higher than the operating voltage of the transistor. The programming voltage can permanently alter the electrical properties of the fuse device and/or the constituent materials of the fuse device. A value can be programmed into a fuse OTP memory array by selectively programming, or "burning," individual fuse devices in the array.

During a readout, or sampling, of the state of the fuse devices in a fuse OTP memory array, each fuse can correspond to a logic value of "0" or "1" which can be sampled and captured by the associated electronic circuitry. For example, an unprogrammed fuse can correspond to logic value "0" and a programmed fuse can correspond to logic value "1". Taken together, the corresponding logic values of the programmed and unprogrammed fuse devices in the array can determine an array value. This array value can correspond to a hardware embedded security sequence.

When an IC including an OTP memory array is manufactured, the unprogrammed OTP memory array may include all unprogrammed devices. In general, an IC with an unprogrammed OTP memory array is referred to as a "virgin chip." The sampled state of all of the programmable elements in the unprogrammed OTP memory array can correspond to the same logic value. For example, if an unprogrammed OTP device can correspond to logic value "0", then the sampled state of each programmable device in the OTP memory array of a virgin chip can be "0". In this case, the unprogrammed, or virgin chip, OTP memory array value can be zero. In another example, if the unprogrammed OTP device can correspond to logic value "1", then the sampled state of each programmable device in the OTP memory array of a virgin chip can be "1". In this case, the unprogrammed, or virgin chip, OTP memory array value can be ($2^n-1$) (e.g. two to nth exponential minus one) where the exponent n is a number of bits which equals a number of programmable devices in the OTP memory array; n can have value that is greater than or equal to one.

One type of hacker attack on an IC is known as a glitch attack. The glitch attack can be a physical disturbance of an IC operating parameter that can create a fault in the IC performance which can be exploited maliciously. The physical disturbance can be implemented, for example, with operating voltage variations, chip temperature changes, applied electric fields, and incident electromagnetic radiation. As an exemplary fault resulting from a glitch attack, a hardware embedded security sequence can be spoofed in an attempt to disable or bypass IC security systems designed to protect, for example, secure memory, processing routines, and/or any other functions, functional elements, or aspects of an IC.

In an exemplary glitch attack on an IC that includes an OTP memory array, a physical condition of the chip may be altered so that during sampling of the programmable device states, the logic value corresponding to the state of each programmable device cannot be unambiguously interpreted as "0" or "1". As an exemplary fault resulting from the glitch attack, a sampled OTP memory array value for an OTP memory array that has been programmed with a sequence, for example a security sequence, may not be equal to the programmed sequence but rather may be a spoofed value. In the above exemplary attack, the OTP memory array may be a fuse OTP memory array, an anti-fuse OTP memory array, or any other type of OTP memory array or device.

In an embodiment, an IC can protect provisioned data in secure memory by using the sampled OTP memory array value to determine if a fault in IC performance has occurred. If the fault is determined to have occurred, access to secure memory may be limited or blocked. As a result, the probability that the provisioned data in secure memory can be subsequently misused, by at least the hackers who initiated the glitch attack, can be reduced.

SUMMARY

An example of a method of protecting memory assets in an integrated circuit according to the disclosure includes sampling a value of each of multiple OTP memory arrays, comparing the sampled value of each OTP memory array with the sampled value of each other OTP memory array and with an unprogrammed OTP memory array value, determining if an integrated circuit performance fault has occurred based on the compared sampled values, booting the integrated circuit, and operating the integrated circuit with access to memory determined by fault occurrence determination.

Implementations of such a method may include one or more of the following features. Determining if the fault has occurred may include determining the fault to have occurred if the sampled value of at least one OTP memory array equals the unprogrammed OTP memory array value and if the sampled value of each OTP memory array is not equal to the sampled value of each other OTP memory array. Determining if the fault has occurred may include determining the fault not to have occurred if the sampled value of each OTP memory array is equal to the sampled value of each other OTP memory array and the sampled value of each OTP memory array is not equal to the unprogrammed OTP memory array value. The unprogrammed OTP memory array value may be zero. The unprogrammed OTP memory array value may be ($2^n-1$) where n may be a number of bits.

An exemplary implementation of the method may include determining an indication of a security signal. The security signal may indicate a secure mode of operation if the fault is determined not to have occurred. The security signal may indicate a non-secure mode of operation if the fault occurrence is determined to have occurred. Access to memory may include limited access to secure memory if the fault is determined to have occurred. Booting the integrated circuit may be unaffected by the fault occurrence determination. The integrated circuit may be a system-on-chip.

An example of a method of protecting memory assets in an integrated circuit according to the disclosure may include sampling a value of a first OTP memory array and a value of a second OTP memory array, comparing the sampled values of the first OTP memory array and the second OTP memory array with one another and with an unprogrammed OTP memory array value, determining if an integrated circuit performance fault has occurred based on the compared sampled values, booting the integrated circuit, and operating the integrated circuit with access to memory determined by the fault occurrence determination.

Implementation of such a method may include one or more of the following features. Determining if the fault has occurred may include determining the fault to have occurred if the sampled value of the first OTP memory array equals the unprogrammed OTP memory array value or if the sampled value of the second OTP memory array equals the unprogrammed OTP memory array value or if the sampled values of both the first and the second OTP memory arrays equal the unprogrammed OTP memory array value. Determining if the fault has occurred may include determining the fault to have occurred if the sampled value of the first OTP memory array does not equal the sampled value of the second OTP memory array. Determining if the fault has occurred may include determining the fault not to have occurred if the sampled value of the first OTP memory array equals the sampled value of the second OTP memory array and the sampled value of the first OTP memory array does not equal the unprogrammed OTP memory array value and the sampled value of the second OTP memory array does not equal the unprogrammed OTP memory array value. The unprogrammed OTP memory array value may be zero. The unprogrammed OTP memory array value may be ($2^n-1$) where n may be a number of bits.

An exemplary implementation of the method may include determining an indication of a security signal. The security signal may indicate a secure mode of operation if the fault is determined not to have occurred. The security signal may indicate a non-secure mode of operation if the fault occurrence is determined to have occurred. Access to memory may include limited access to secure memory if the fault is determined to have occurred. Booting the integrated circuit may be unaffected by the fault occurrence determination. The integrated circuit may be a system-on-chip.

An example of a system for protecting memory assets in an integrated circuit according to the disclosure may include a plurality of OTP memory arrays, circuitry configured to sample a value of each of the plurality of OTP memory arrays, a comparison logic block configured to compare the sampled value of each OTP memory array with the sampled value of each other OTP memory array and with an unprogrammed OTP memory array value and determine if an integrated circuit performance fault has occurred based on the compared sampled values, and at least one processing module configured to boot the integrated circuit and operate the integrated circuit with access to memory determined by the fault occurrence determination.

An exemplary implementation of the system may include the comparison logic block being configured to determine the fault to have occurred if the sampled value of at least one OTP memory array equals the unprogrammed OTP memory array value, determine the fault to have occurred if the sampled value of each OTP memory array is not equal to the sampled value of each other OTP memory array, and determine the fault not to have occurred if the sampled value of each OTP memory array is equal to the sampled value of each other OTP memory array and the sampled value of each OTP memory array is not equal to the unprogrammed OTP memory array value. The unprogrammed OTP memory array value may be zero. The unprogrammed OTP memory array value may be ($2^n-1$) where n may be a number of bits.

An example of the system may include the comparison logic block being configured to determine an indication of a security signal. The security signal may indicate a secure mode of operation if the fault is determined not to have occurred. The security signal may indicate a non-secure mode of operation if the fault is determined to have occurred. Access to memory may include limited access to secure memory if the fault is determined to have occurred. Booting the integrated circuit may be unaffected by the fault occurrence determination. The integrated circuit may be a system-on-chip.

An example of a system for protecting memory assets in an integrated circuits according to the disclosure may include means for sampling a value of each of a plurality of OTP memory arrays, means for comparing the sampled value of each OTP memory array of the plurality of OTP memory arrays with the sampled value of each other OTP memory array of the plurality of OTP memory arrays and with an unprogrammed OTP memory array value, means for detecting an integrated circuit performance fault occurrence based on the compared sampled values, means for booting the integrated circuit, and means for operating the integrated circuit with access to memory determined by the fault occurrence determination.

An exemplary implementation of the system may include determining the fault to have occurred if the sampled value of at least one OTP memory array equals the unprogrammed OTP memory array value, determining the fault to have occurred if the sampled value of each OTP memory array is not equal to the sampled value of each other OTP memory array, and determining the fault not to have occurred if the sampled value of each OTP memory array is equal to the sampled value of each other OTP memory array and the sampled value of each OTP memory array is not equal to the unprogrammed OTP memory array value. The unprogrammed OTP memory array value may be zero. The unprogrammed OTP memory array value may be ($2^n-1$) where n may be a number of bits.

An example of the system may include means for determining an indication of a security signal. The security signal may indicate a secure mode of operation if the fault occurrence is determined not to have occurred. The security signal may indicate a non-secure mode of operation if the fault is determined to have occurred. Access to memory may include limited access to secure memory if the fault is determined to have occurred. Booting the integrated circuit may be unaffected by the fault occurrence determination. The integrated circuit may be a system-on-chip.

An example of a computer program product residing on a processor-readable non-transitory storage medium according to the disclosure may include processor-readable instructions executable by one or more processors to cause circuitry to sample a value of each of a plurality of OTP memory arrays, cause a comparison logic block to compare the sampled value of each OTP memory array with the sampled value of each other OTP memory array and with an unprogrammed OTP memory array value and to determine if an integrated circuit performance fault has occurred based on the compared sampled values, boot the integrated circuit, and operate the integrated circuit with access to memory determined by the fault occurrence determination.

An exemplary implementation of the computer program product may include processor-readable instructions to cause the comparison logic block to determine the fault to have occurred if the sampled value of at least one OTP memory array equals the unprogrammed OTP memory array value, determine the fault to have occurred if the sampled value of each OTP memory arrays is not equal to the sampled value of each other OTP memory array, and determine the fault not to have occurred if the sampled value of each OTP memory array is equal to the sampled value of each other OTP memory array and the sampled value of each OTP memory array is not equal to the unprogrammed OTP memory array value. The unprogrammed OTP memory array value may be zero. The unprogrammed OTP memory array value may be $(2^n-1)$ where n may be a number of bits.

An example of the computer program product may include processor-readable instructions to cause the comparison logic block to determine an indication of a security signal. The security signal may indicate a secure mode of operation if the fault is determined not to have occurred. The security signal may indicate a non-secure mode of operation if the fault is determined to have occurred. Access to memory may include limited access to secure memory if the fault is determined to have occurred. Booting the integrated circuit may be unaffected by the fault occurrence determination. The integrated circuit may be a system-on-chip.

In accordance with implementations of the invention, one or more of the following capabilities may be provided. A glitch attack on an integrated circuit can be detected by determining that a fault has occurred. The values of two or more OTP arrays can be compared with one another and with an unprogrammed OTP array value. If the comparison results determine a fault to have occurred then memory assets in an integrated circuit can be protected. Booting the integrated circuit is not affected by the determination that a fault has occurred. These and other capabilities of the invention, along with the invention itself, will be more fully understood after a review of the following figures, detailed description and claims. Other capabilities may be provided and not every implementation according to the disclosure must provide any, let alone all, of the capabilities discussed. Further it may be possible for an effect noted above to be achieved by means other than that noted and a noted item/technique may not necessarily yield the noted effect.

DETAILED DESCRIPTION

Embodiments of the invention provide techniques for utilizing a hardware embedded security system to detect or determine the occurrence of a fault in SoC performance induced, for example, by a glitch attack. The techniques discussed below are exemplary, however, and not limiting of the invention as other implementations in accordance with the disclosure are possible. The described techniques may be implemented as a method, apparatus, or system and can be embodied in computer-readable media.

Fuse OTP memory array values are sampled when a SoC is powered on or reset. The value of a fuse OTP memory array is compared with an unprogrammed, or virgin chip, fuse OTP memory array value and with the value of one or more other fuse OTP memory arrays. If each of the fuse OTP memory array values are equal and no array value is equal to the unprogrammed value, then no fault is determined to have occurred, the SoC is determined not to have been the subject of a glitch attack, and a security signal is set to indicate a secure mode of operation. If the array values for the fuse OTP memory arrays are not all equal, or at least one of the array values is equal to the unprogrammed value, then a fault is determined to have occurred, the SoC is determined to have been the subject of a glitch attack, and a security signal is set to indicate a non-secure mode of operation. The SoC is booted according to the same procedures for both the secure mode of operation and the non-secure mode of operation. After the SoC is booted, in a non-secure mode of operation the SoC is operated with limited, blocked, or otherwise controlled access to secure memory and any provisioned data stored therein in response to the security signal indication. In a secure mode of operation, the SoC is operated with access to secure memory and any provisioned data stored therein. In the secure mode of operation, the degree, level, or type of access to secure memory and any provisioned data stored therein is not limited in response to the security signal indication but may be limited, blocked, or otherwise controlled in response to parameters other than the security signal indication. This procedure is repeated every time the SoC is powered on or reset.

Figure 1:
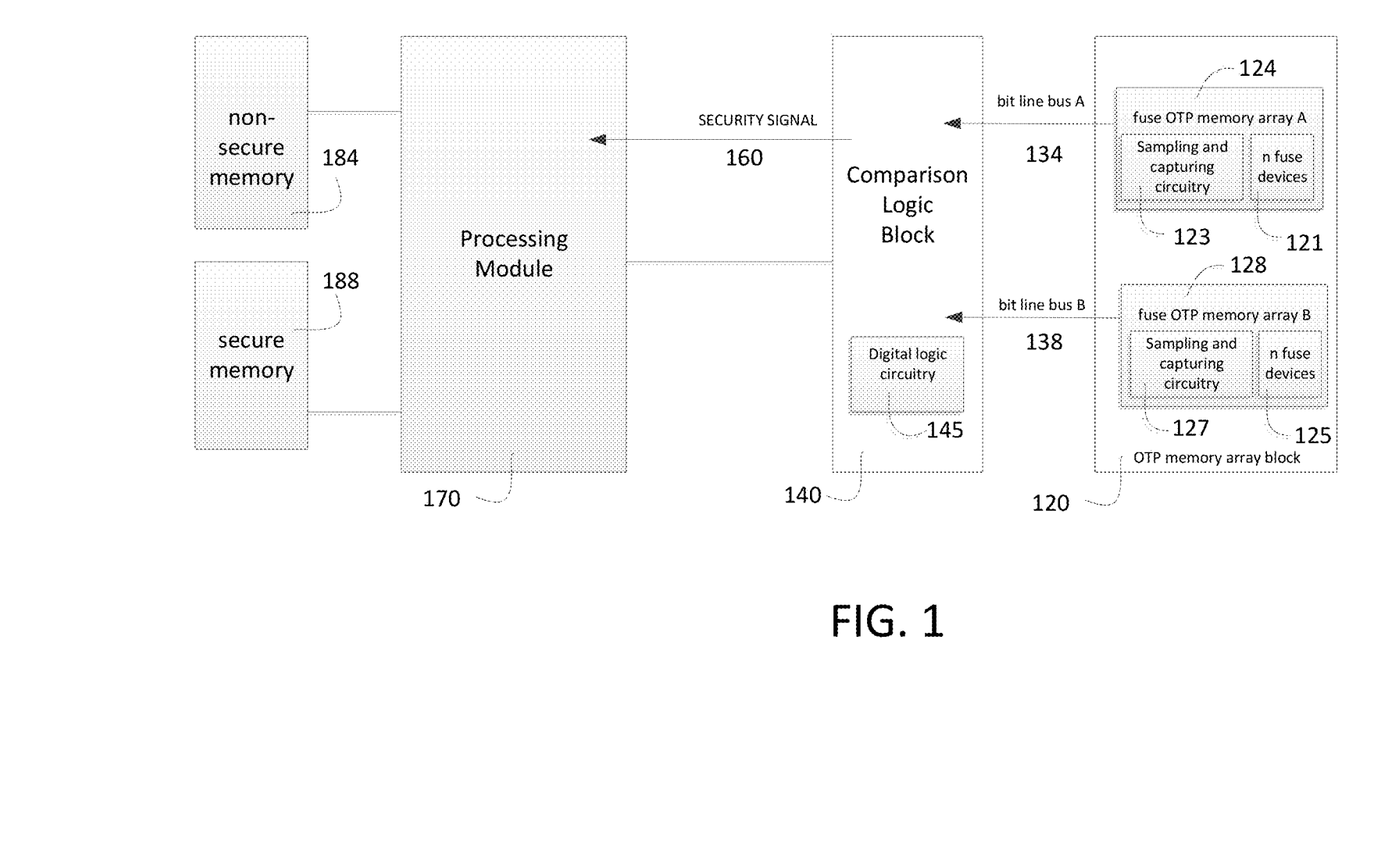
FIG. 1 is a block diagram illustrating an embodiment of a hardware embedded security system in a SoC including two fuse OTP memory arrays.

Referring to FIG. 1, a block diagram illustrating an embodiment of a hardware embedded security system 100 for protecting memory assets in a SoC is shown. The system 100 is exemplary and may also be in another type of IC and is not limited to SoC. The system 100 is not limiting and may be altered, e.g., by having components added, removed, or rearranged.

The system 100 can be part of an electronic system, or end device, not shown in FIG. 1. The end device can be any electronic system that includes ICs, for example, set-top boxes, personal computers, laptop computers, hand-held devices, tablets, and modems.

In an embodiment, the system 100 can include an OTP memory array block 120, a comparison logic block 140, a processing module 170, non-secure memory 184, and secure memory 188. The OTP memory array block 120 can include two fuse OTP memory arrays, fuse OTP memory array A 124 and fuse OTP memory array B 128. Fuse OTP memory array A 124 can include n fuse devices 121, where n is an integer greater than or equal to one, and sampling and capturing circuitry 123. Similarly, fuse OTP memory array B 128 can include n fuse devices 125, where n has the same value as fuse OTP memory array A, and sampling and capturing circuitry 127. The components of fuse OTP memory array A 124 and fuse OTP memory array B 128 shown in FIG. 1 are exemplary and not limiting; both fuse OTP memory arrays may also include other components not shown.

The sampling and capturing circuitry, 123 and 127, can sample and capture the logic values corresponding to the programmed/unprogrammed states of the n fuse devices, 121 and 125, respectively.

In an embodiment, an unprogrammed fuse may correspond to a logic value of "0" and a programmed fuse may correspond to a logic value of "1". In certain exemplary implementations, an unprogrammed fuse may correspond to a logic value of "1" and a programmed fuse may correspond to a logic value of "0". In an embodiment, OTP memory array block 120 may include one or more inverter devices which may cause an unprogrammed fuse OTP device to correspond to a logic value of "1" and cause a programmed fuse OTP device to correspond to a logic value of "0". In exemplary applications, OTP memory array block 120 may include anti-fuse devices or any other types of OTP devices.

OTP memory array block 120 can be coupled to comparison logic block 140 via two bit line buses, bit line bus A 134 and bit line bus B 138. Each bit line bus 134 and 138 can carry n signals from fuse OTP memory arrays 124 and 128, respectively. Each of the n signals can correspond to the sampled and/or captured logic value of one of the n fuse OTP devices.

The comparison logic block can be coupled to processing module 170. A security signal 160 can be sent from the comparison logic block 140 to the processing module 170 via an electrical connection or any other type of connection configured to propagate a signal.

The processing module 170 can be coupled to memory blocks 184 and 188 which may include random access memory (RAM) or any other type of IC memory. Memory block 184 may be non-secure memory and memory block 188 may be secure memory. Both non-secure memory 184 and secure memory 188 may contain provisioned data.

The connections shown in FIG. 1 between the elements of system 100 are exemplary. Additional connections between the elements may be used. There may also be connections between the elements shown in FIG. 1 and other elements not shown in FIG. 1 but included in a hardware embedded security system and/or SoC or other IC. One or more other processors, not shown, may be included in a system 100.

In order to protect provisioned data that may be stored in secure memory block 188 of system 100, or in other secure memory accessible to the processing module 170, fuse OTP memory arrays A 124 and B 128 may be programmed with identical security sequences after chip manufacturing, for example during manufacture of the electronic system, or end device, containing system 100.

In an embodiment, the OTP memory array block 120 can include fuse OTP devices configured in such a manner that, for the unprogrammed OTP memory array of the virgin chip, the sampled states of all of the unprogrammed fuse devices in fuse OTP memory array A 124 and fuse OTP memory array B 128 all may correspond to the same logic value of "0". Thus, with n unprogrammed fuse devices, the sampled state of fuse OTP memory array A 124 may correspond to an n-bit value of zero. Likewise, the sampled state of fuse OTP memory array B 128 may correspond to an n-bit value of zero. In a particular exemplary implementation, the sampled state of unprogrammed OTP devices may correspond to a logic value of "1" and the sampled state of programmed OTP devices may correspond to a logic value of "0". Therefore, in such an exemplary implementation, the sampled n-bit value of each OTP memory array in OTP memory array block 120 may be ($2^n$−1), corresponding to n bits all of logic value "1". This non-zero value of ($2^n$−1), determined by the value of n, may be the unprogrammed OTP memory array value of a virgin chip.

In an embodiment, the fuse OTP memory arrays A 124 and B 128 can be programmed with identical security sequences. Programming the security sequence into fuse OTP memory arrays A 124 and B 128 can be implemented by selectively programming the fuses in the OTP memory arrays. Subsequent to programming, the sampled array value of fuse OTP memory array A 124 may be identical to the sampled array value of fuse OTP memory array B 128. Further, the sampled array values may not equal the unprogrammed virgin chip OTP memory array value.

In an embodiment, when a SoC including system 100 is powered on or reset, the fuse states for the n fuse devices 121 of fuse OTP memory array A 124 and the fuse states for the n fuse devices 125 of fuse OTP memory array B 128 can be sampled and captured by the sampling and capturing circuitry 123 and 127, for fuse OTP memory array A 124 and fuse OTP memory array B 128, respectively. The sampled array value for fuse OTP memory array A 124 can be sent via bit line bus A 134 to a comparison logic block 140. Similarly, the sampled array value for fuse OTP memory array B 128 can be sent via bit line bus B 138 to the comparison logic block 140.

The comparison logic block 140 can include digital logic circuitry 145. The digital logic circuitry 145 can include, but is not limited to, AND gates, NAND gates, OR gates, NOR gates, XOR gates and any combinations thereof. In an embodiment, the digital logic circuitry 145 can compare the sampled value for each fuse OTP memory array, 124 and 128, to the unprogrammed virgin chip array value and can also compare the sampled value for fuse OTP memory array A 124 with the sampled value for fuse OTP memory array B 128. Based on these comparisons, the comparison logic block 140 can determine whether or not a fault due, for example, to a glitch attack has occurred.

In certain implementations, the unprogrammed virgin chip value for each array can be zero. In this case, the sampled valued for each fuse OTP memory array, 124 and 128, can be compared to zero by the digital logic circuitry 145. In other exemplary implementations, the unprogrammed virgin chip value for each array of n elements may be ($2^n$−1). In such implementations, the sampled value for each fuse OTP memory array, 124 and 128, can be compared with ($2^n$−1).

In a particular implementation, the comparison logic block 140 can determine that no fault has occurred if the sampled values for fuse OTP memory array A 124 and for fuse OTP memory array B 128 are identical and non-zero. In this case, the sampled values for both fuse OTP memory arrays 124 and 128 may correspond to the identical security sequences that may be programmed into both fuse OTP memory arrays 124 and 128. In another particular implementation, the comparison logic block 140 can determine that no fault has occurred if the sampled values for fuse OTP memory array A 124 and for fuse OTP memory array B 128 are identical and not equal to ($2^n$−1).

In an embodiment, the comparison logic block 140 can determine that a fault has occurred if the sampled values for fuse OTP memory array A 124 and fuse OTP memory array B are not identical. As discussed above, if a fault has occurred, for example, due to a glitch attack, the sampled values of fuse OTP memory arrays 124 and/or 128 may be spoofed and, therefore, may be neither identical nor equal to the programmed security sequence.

In a particular implementation, the comparison logic block 140 can determine that a fault has occurred if the sampled value for fuse OTP memory array A 124 and/or the sampled value for fuse OTP memory array B 128 are equal to zero. This case may correspond to a virgin chip.

In a particular implementation, the comparison logic block 140 can determine that a fault has occurred if the sampled value for fuse OTP memory array A 124 and/or the sampled value for fuse OTP memory array B 128 correspond to $(2^n-1)$. This case may correspond to a virgin chip.

In the case of the virgin chip, a false positive may be realized with regard to the determination that a fault has occurred. The comparison logic block 140 may indicate that a fault due, for example, to a glitch attack, has occurred even in the absence of such a fault or attack based on the comparison criteria described above for the sampled values of the fuse OTP memory arrays. Such a false positive result is mitigated because blocked or limited access to secure memory of a virgin chip may be insignificant in the operation of the chip since, for example, secure memory of a virgin chip may not contain provisioned data for which protection is needed and/or desired.

Based on the fault occurrence determination, the comparison logic block 140 can generate a security signal 160 which can indicate a secure mode of operation or a non-secure mode of operation. If the comparison logic block 140 determines that a fault has occurred, then the security signal 160 can indicate a non-secure mode of operation. Since a virgin chip can generate a false positive with regard to the occurrence of the fault, the security signal 160 can indicate a non-secure mode of operation in the case of the virgin chip. If the comparison logic block 140 determines that a fault has not occurred, then the security signal 160 can indicate a secure mode of operation.

The security signal 160 can be sent by the comparison logic block 160 to the processing module 170. In an embodiment, the processing module 170 can boot the SoC according to the same processing routines regardless of the security signal indication of secure mode of operation or non-secure mode of operation. Booting processor routines may not be affected by limited or blocked access to secure memory 188. In particular applications, the processing module 170 may test devices or functions of the SoC. Testing processor routines may not be affected by limited or blocked access to secure memory 188. Therefore, at least booting and testing of the SoC can be unaffected by the security signal indication.

Once the SoC is booted, the SoC can operate with access to memory as determined by the security signal indication. If security signal 160 indicates a secure mode of operation, then the SoC may access non-secure memory 184, secure memory 188, along with provisioned data that may be stored therein, and any other memory used in SoC operation. In an embodiment, in a secure mode of operation, access to secure memory and any provisioned data stored therein may be unlimited. In a particular embodiment, in a secure mode of operation access to secure memory and any provisioned data stored therein may be limited, blocked, or otherwise controlled in response to parameters excluding the security signal indication. Conversely, if security signal 160 indicates a non-secure mode of operation, then, in response to the security signal indication, the SoC may limit or block access to secure memory 188 along with provisioned data that may be stored therein.

In an embodiment, the security signal indication of a non-secure mode of operation generated by the false positive in the case of the virgin chip may not affect booting and testing of the SoC. For example, because a virgin chip may not include provisioned data in secure memory 188, lack of access, or limited access, to secure memory 188 during SoC operation may be irrelevant.

During manufacture of the electronic system or end device including the system 100, security sequences may be programmed into the OTP memory array block 120. Subsequently, when provisioned data is stored in secure memory 188, system 100 may use the programmed security sequences to determine a fault occurrence due for example, to a glitch attack, hacker attack, or other physical disturbance. In response to a detected or determined fault occurrence, system 100 can protect secure memory 188 and any provisioned data that may be stored therein by blocking or limiting access to secure memory 188.

Figure 2:
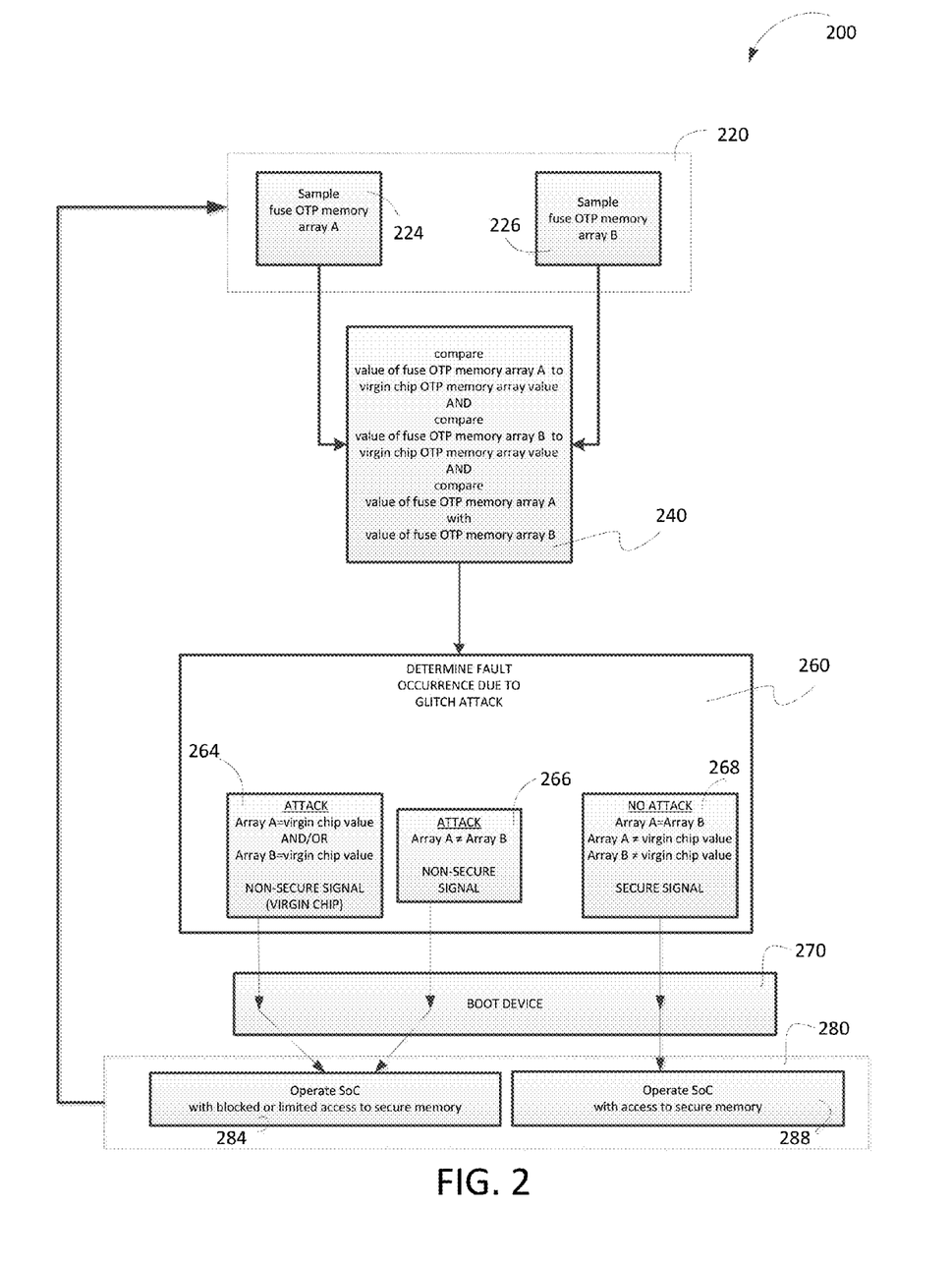
FIG. 2 is a process diagram for a hardware embedded security method including two fuse OTP memory arrays.

In operation, referring to FIG. 2, with further reference to FIG. 1, a hardware embedded security method 200 using the system 100 includes the stages shown. The method 200, however, is exemplary only and not limiting. The method 200 may be altered, e.g., by having stages added, removed, or rearranged.

The method 200 includes sampling fuse OTP memory arrays 220, comparing sampled fuse OTP memory array values 240, determining the occurrence of a fault 260, booting the SoC 270, and operating the SoC 280.

At stage 220, the fuse device states for the constituent OTP memory arrays of OTP memory array block 120 are sampled and captured when the SoC is powered on or reset. At stage 224, the fuse states of the n fuse devices 121 of fuse OTP memory array A 124 are sampled and captured by the sampling and capturing circuitry 123 shown in FIG. 1. Similarly, at stage 226, the fuse states of the n fuse devices 125 for fuse OTP memory array B are sampled and captured by the sampling and capturing circuitry 127 shown in FIG. 1.

At stage 240, using the digital logic circuitry 145, the sampled fuse OTP memory array values, provided to the comparison logic block 140 by bit line bus A 134 and bit line bus B 138, are compared to one another and to the virgin chip or unprogrammed OTP memory array value. In an embodiment, a sampled array value of zero corresponds to the virgin chip value. In certain applications, a sampled n-bit array value of $(2^n-1)$, for n bits all of value "1", corresponds to the virgin chip value.

At stage 260, the occurrence of a fault can be determined. If the sampled values for fuse OTP memory array A 124 and/or fuse OTP memory array B 128 indicate a virgin chip (i.e. either all "1" or all "0", in various embodiments, for all n fuse devices, 121 and 125, of both arrays), then a fault is determined to have occurred at stage 264. In this case of the virgin chip, the fault detection is a false positive. If the sampled values for fuse OTP memory array A 124 and fuse OTP memory array B 128 are not identical, then a fault is determined to have occurred at stage 266. If the sampled values for fuse OTP memory array A 124 and fuse OTP memory array B are identical and neither indicates a virgin chip, then at stage 268 a fault is determined not to have occurred. Stages 264, 266, and 268 are mutually exclusive so only one of these states can exist at stage 260 of method 200.

Additionally, at stage 260, a security signal 160 is generated, by comparison logic block 140, such that the indication of the security signal 160 is determined by the determination of a fault occurrence produced, for example, by a glitch attack, hacker attack, or other physical disturbance. A security signal indication of a non-secure mode of operation is generated if a fault is determined to have occurred and a security signal indication of a secure mode of operation is generated if a fault is determined not to have occurred.

At stage 270, the SoC is booted by the processing module 170 using the same processing routines regardless of the indication of the security signal 160. The SoC can boot according to the same routines or procedures in both a non-secure mode of operation and a secure mode of operation. Booting routines for the SoC may not require access to secure memory 188. In an exemplary implementation, SoC components may also be tested at stage 270. Testing routines may not require access to secure memory 188. Testing routines or procedures can be the same for both a non-secure mode of operation and a secure mode of operation.

At stage 280, the SoC is operated with access to secure memory 188 determined by the indication of the security signal 160. For a non-secure mode of operation, the SoC is operated with blocked or limited access to secure memory 188 thereby protecting the provisioned data that may be stored therein. Conversely, for a secure mode of operation, the SoC is operated with access to secure memory 188 and the provisioned data that may be stored therein. In an embodiment, in a secure mode of operation, access to secure memory and any provisioned data stored therein may be unlimited. In a particular embodiment, in a secure mode of operation, access to secure memory and any provisioned data stored therein may be limited, blocked, or otherwise controlled in response to parameters excluding the security signal indication.

As discussed above with regard to FIG. 1, the negative implications of the false positive associated with the virgin chip are mitigated because booting and testing routines may be unaffected by blocked access to secure memory 188. Additionally, the secure memory 188 of the virgin chip may not include provisioned data and, therefore, lack of access to secure memory 188 may be irrelevant for the virgin chip.

In an embodiment, method 200 can repeat every time the SoC is powered on or reset.

In further reference to FIG. 1, in an embodiment, the OTP memory array block 120 can include a plurality of M fuse OTP memory arrays and associated sampling and capturing circuitry, where M is an integer greater than or equal to two. Each fuse OTP memory array of the M fuse OTP memory arrays can include n fuse devices, where n is an integer greater than or equal to one and has the same value for all of the M fuse OTP memory arrays. In a particular application, OTP memory array block 120 can include M OTP memory arrays utilizing anti-fuse OTP devices or any other types of OTP devices.

In an embodiment, an OTP memory array block 120 can be coupled to comparison logic block 140 via M bit line buses. Each bit line bus can carry n signals from one of the M OTP memory arrays.

In an embodiment, the digital logic circuitry 145, of comparison logic block 140, can compare the sampled value for each of M fuse OTP memory arrays with the unprogrammed virgin chip array value and with each of the remaining (M−1) fuse OTP memory arrays. As described above in reference to FIG. 1, based on this comparison, the comparison logic block 140 can determine if a fault has occurred.

In an embodiment, the comparison logic block 140 can determine that no fault has occurred if the sampled values for M fuse OTP memory arrays are identical and not equal to the virgin chip value. During manufacture of the electronic system, or end device, identical security sequences may be programmed into all of the M fuse OTP memory arrays. In the absence of a fault, the sampled values for the M fuse OTP memory arrays may all equal the programmed security sequence.

In certain implementations, the unprogrammed virgin chip value for each array can be zero. In this case, the sampled value for each of the M fuse OTP memory arrays can be compared to zero by the digital logic circuitry 145. In other exemplary implementations, the unprogrammed virgin chip value for each array can be ($2^n-1$). In such implementations, the sampled value for each of M fuse OTP memory arrays can be compared with ($2^n-1$).

In an embodiment, the comparison logic block 140 can determine that a fault has occurred if the sampled values for all of the M fuse OTP memory arrays are not identical, or equal, or if the sampled value for at least one of the M fuse OTP memory arrays is equal to zero. This latter case may correspond to a virgin chip. As discussed above, if a fault has occurred, the sampled values of any or all of the M fuse OTP memory arrays may be spoofed and, therefore, may be neither identical nor equal to the programmed security sequence.

In an implementation, the comparison logic block 140 can determine that a fault has occurred if the sampled values for the M fuse OTP memory arrays are not identical or if the sampled value for at least one of the M fuse OTP memory arrays is equal to ($2^n-1$). This latter case may correspond to an unprogrammed virgin chip.

Figure 3:
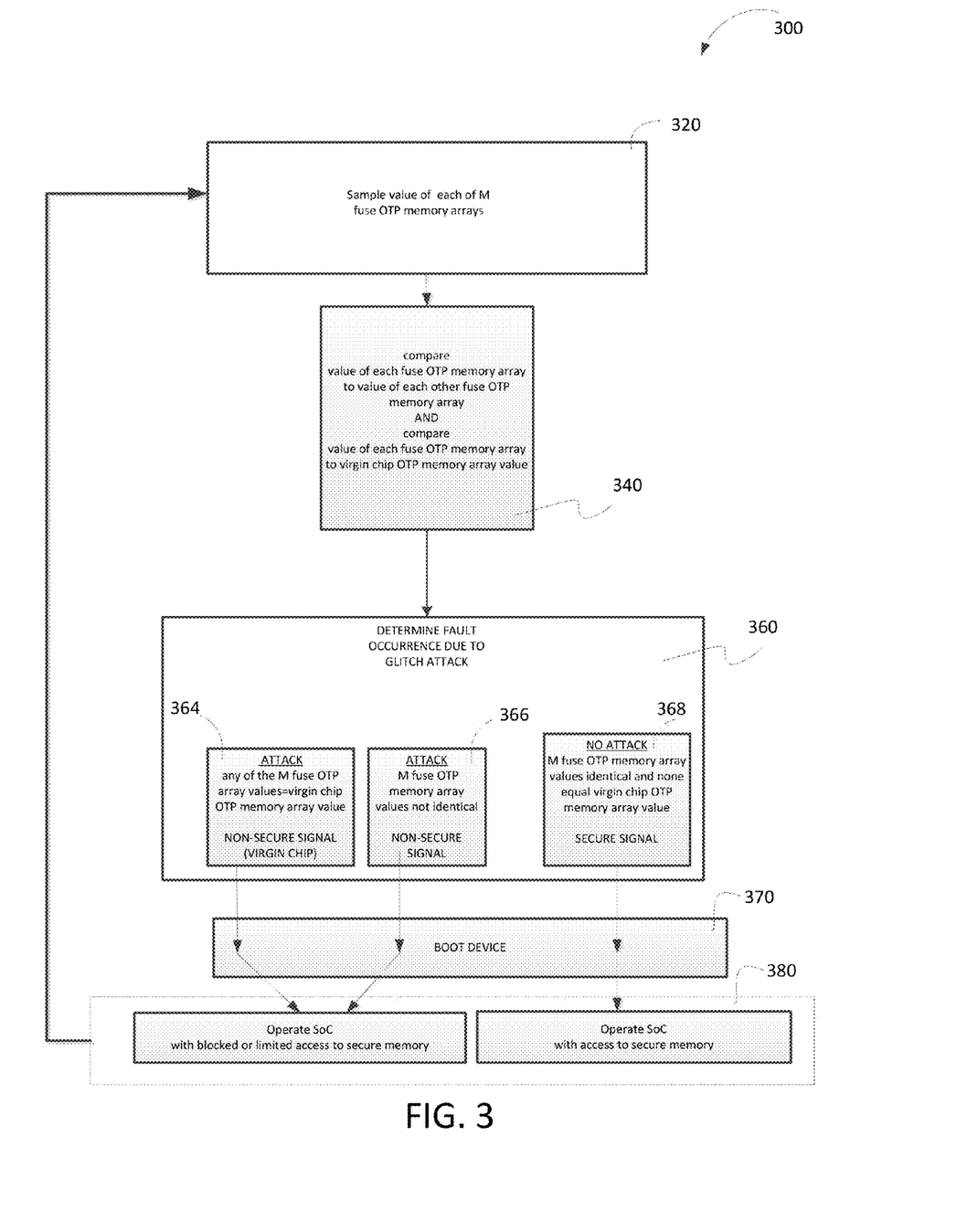
FIG. 3 is a process diagram for a hardware embedded security method including M OTP memory arrays.

In operation, referring to FIG. 3, with further reference to FIG. 1, a hardware embedded security method 300, includes the stages shown. The method 300, however, is exemplary only and not limiting. The method 300 may be altered, e.g., by having stages added, removed, or rearranged.

The method embodiment 300 for identifying the occurrence of a fault on a SoC chip using an embodiment of system 100 as described above, which includes a plurality of M fuse OTP memory arrays and associated sampling and capturing circuitry, where M is an integer greater than or equal to two, can be similar to but not dependent on method 200.

The method 300 includes sampling the value of M fuse OTP memory arrays 320, comparing the sampled value of each fuse OTP memory array with the sampled value of each other fuse OTP memory array value 340, determining the occurrence of a fault 360, booting the SoC 370, and operating the SoC 380.

At stage 320, the n fuse device states for M fuse OTP memory arrays in OTP memory array block 120 can be sampled and captured when the SoC is powered on or reset.

In an embodiment, at stage 340, using the digital logic circuitry 145, the sampled fuse OTP memory array values, provided to the comparison logic block 140 by M bit line buses, are compared to one another and to the unprogrammed virgin chip OTP memory array value.

In an embodiment, at stage 360, the occurrence of a fault is determined. If the sampled value for at least one of the M fuse OTP memory arrays indicates a virgin chip (i.e. either an array value of zero or an array value of ($2^n-1$), in various embodiments), then a fault is determined to have occurred at stage 364. For the virgin chip, the fault detection is a false positive. If the sampled values for the M fuse OTP memory arrays are not identical and not equal to the virgin chip value, then a fault is determined to have occurred at stage 366. If the sampled values for the M fuse OTP memory arrays are identical and none indicate a virgin chip, then at stage 368 a fault is determined not to have occurred. Stages 364, 366, and 368 are mutually exclusive so only one of these states can exist at stage 360 of method 300 embodiment.

In a method 300 embodiment utilizing M fuse OTP memory arrays, stages 370 and 380 proceed as described above with regard to stages 270 and 280, respectively, of method 200 and as shown in FIG. 2.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium know in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one of more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage medium includes any medium that facilitates transfer of a computer program from one place to another. A storage media may be any available media that can be accessed by a general purpose or special purpose computer. By way of example, and not limitations, such computer-readable media can comprise RAM, ROM, EEPROM, CD-RIM or other optical disk storage, magnetic disk storage or other magnetic storage devices, or any other medium that can be used to carry or store desired program code means in the form of instructions or data structures and that can be accessed by a general-purpose or special purpose computer, or a general purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

Further, while the description above refers to the invention, the description may include more than one invention.

As used herein, including in the claims, unless otherwise stated, a statement that a function or operation is "based on" an item or condition means that the function or operation is based on the stated item or condition and may be based on one or more items and/or conditions in addition to the stated item or condition.

What is claimed is:

1. A method of protecting memory assets in an integrated circuit, the method comprising:
   sampling a value of each of a plurality of one-time programmable (OTP) memory arrays;
   comparing the sampled value of each OTP memory array of the plurality of OTP memory arrays with the sampled value of each other OTP memory array of the plurality of OTP memory arrays and with an unprogrammed OTP memory array value wherein the unprogrammed OTP memory array value corresponds to n bits all of a same logic value associated with an as-manufactured OTP memory array, n being a number of memory devices in each of the plurality of OTP memory arrays;
   determining if the sampled value of each OTP memory array is equal to the sampled value of each other OTP memory array;
   determining that an integrated circuit performance fault has occurred if the sampled value of each OTP memory array is equal to the sampled value of each other OTP memory array and the sampled value of each OTP memory array is equal to the unprogrammed OTP memory array value; and
   operating the integrated circuit with access to memory determined by the fault occurrence determination.

2. The method of claim 1 wherein determining that the integrated circuit performance fault has occurred further comprises:
   if the sampled value of each OTP memory array is not equal to the sampled value of each other OTP memory array, then determining the fault to have occurred; and
   if the sampled value of each OTP memory array is equal to the sampled value of each other OTP memory array and the sampled value of each OTP memory array is not equal to the unprogrammed OTP memory array value, then determining the fault not to have occurred.

3. The method of claim 1 wherein the unprogrammed OTP memory array value is zero.

4. The method of claim 1 wherein the unprogrammed memory array value is $(2^n-1)$.

5. The method of claim 1 comprising determining an indication of a security signal wherein
   the security signal indicates a secure mode of operation if the fault is determined not to have occurred and
   the security signal indicates a non-secure mode of operation if the fault is determined to have occurred.

6. The method of claim 1 wherein access to memory comprises limited access to secure memory if the fault is determined to have occurred.

7. The method of claim 1 wherein booting the integrated circuit is unaffected by the fault occurrence determination.

8. The method of claim 1 wherein the integrated circuit comprises a system-on-chip.

9. A method of protecting memory assets in an integrated circuit, the method comprising:
   sampling a value of a first one-time programmable (OTP) memory array and a value of a second OTP memory array;
   comparing the sampled values of the first OTP memory array and the second OTP memory array with one another and with an unprogrammed OTP memory array value, wherein the unprogrammed OTP memory array value corresponds to n bits all of a same logic value associated with an as-manufactured OTP memory array, n being a number of memory devices in each of the first OTP memory array and the second OTP memory array;
   determining if the sampled value of the first OTP memory array is equal to the sampled value of the second OTP memory array;
   determining that an integrated circuit performance fault has occurred if the sampled value of the first OTP memory array is equal to the sampled value of the second OTP memory array and the sampled value of each of the first OTP memory array and the second OTP memory array is equal to the unprogrammed OTP memory array value; and
   operating the integrated circuit with access to memory determined by the fault occurrence determination.

10. The method of claim 9 wherein determining that the integrated circuit performance fault has occurred further comprises:
    if the sampled value of the first OTP memory array does not equal the sampled value of the second OTP memory array, then determining the fault to have occurred; and
    if the sampled value of the first OTP memory array equals the sampled value of the second OTP memory array and the sampled value of the first OTP memory array does not equal the unprogrammed OTP memory array value and the sampled value of the second OTP memory array does not equal the unprogrammed OTP memory array value, then determining the fault not to have occurred.

11. The method of claim 9 wherein the unprogrammed OTP memory array value is zero.

12. The method of claim 9 wherein the unprogrammed OTP memory array value is $(2^n-1)$.

13. The method of claim 9 comprising determining an indication of a security signal wherein
    the security signal indicates a secure mode of operation if the fault occurrence is determined not to have occurred and
    the security signal indicates a non-secure mode of operation if the fault is determined to have occurred.

14. The method of claim 9 wherein access to memory comprises limited access to secure memory if the fault is determined to have occurred.

15. The method of claim 9 wherein booting the integrated circuit is unaffected by the detecting of the fault occurrence.

16. The method of claim 9 wherein the integrated circuit comprises a system-on-chip.

17. A system for protecting memory assets in an integrated circuit, the system comprising:
    a plurality of one-time programmable (OTP) memory arrays;
    circuitry configured to sample a value of each of the plurality of OTP memory arrays;
    a comparison logic block configured to compare the sampled value of each OTP memory array of the plurality of OTP memory arrays with the sampled value of each other OTP memory array of the plurality of OTP memory arrays and with an unprogrammed OTP memory array value, wherein the unprogrammed OTP memory array value corresponds to n bits all of a same logic value associated with an as-manufactured OTP memory array, n being a number of memory devices in each of the plurality of OTP memory arrays, and determine if the sampled value of each OTP memory array is equal to the sampled value of each other OTP memory array,
    wherein the comparison logic block is further configured to determine the fault to have occurred if the sampled value of each OTP memory array is equal to the sampled value of each other OTP memory array and the sampled value of each OTP memory array is equal to the unprogrammed OTP memory array value; and
    at least one processing module configured to operate the integrated circuit with access to memory determined by the fault occurrence determination.

18. The system of claim 17 wherein the comparison logic block is further configured to:
    determine the fault to have occurred if the sampled value of each OTP memory array is not equal to the sampled value of each other OTP memory array; and
    determine the fault not to have occurred if the sampled value of each OTP memory array is equal to the sampled value of each other OTP memory array and the sampled value of each OTP memory array is not equal to the unprogrammed OTP memory array value.

19. The system of claim 17 wherein the unprogrammed OTP memory array value is zero.

20. The system of claim 17 wherein the unprogrammed OTP memory array value is $(2^n-1)$.

21. The system of claim 17 wherein the comparison logic block is configured to determine an indication of a security signal wherein the security signal indicates a secure mode of operation if the fault is determined not to have occurred and the security signal indicates a non-secure mode of operation if the fault occurrence is determined to have occurred.

22. The system of claim 17 wherein access to memory comprises limiting access to secure memory if the fault is determined to have occurred.

23. The system of claim 17 wherein the integrated circuit is booted by routines unaffected by the fault occurrence determination.

24. The system of claim 17 wherein the integrated circuit comprises a system-on-chip.

25. A system for protecting memory assets in an integrated circuit, the system comprising:
   means for sampling a value of each of a plurality of one-time programmable (OTP) memory arrays;
   means for comparing the sampled value of each OTP memory array of the plurality of OTP memory arrays with the sampled value of each other OTP memory array of the plurality of OTP memory arrays and with an unprogrammed OTP memory array value, wherein the unprogrammed OTP memory array value corresponds to n bits all of a same logic value associated with an as-manufactured OTP memory array, n being a number of memory devices in each of the plurality of OTP memory arrays;
   means for determining if the sampled value of each OTP memory array is equal to the sampled value of each other OTP memory array;
   means for determining that an integrated circuit performance fault has occurred if the sampled value of the first OTP memory array is equal to the sampled value of the second OTP memory array and the sampled value of each the first OTP memory array and the second OTP memory array is equal to the unprogrammed OTP memory array value; and
   means for operating the integrated circuit with access to memory determined by the fault occurrence determination.

26. The system of claim 25 wherein the means for determining that the integrated circuit performance fault has occurred comprises:
   means for determining that the integrated circuit performance fault has occurred if the sampled value of each OTP memory array is not equal to the sampled value of each other OTP memory array; and
   means for determining that the integrated circuit performance fault has not occurred if the sampled value of each OTP memory array is equal to the sampled value of each other OTP memory array and the sampled value of each OTP memory array is not equal to the unprogrammed OTP memory array value.

27. The system of claim 25 wherein the unprogrammed OTP memory array value is zero.

28. The system of claim 25 wherein the unprogrammed OTP memory array value is ($2^n-1$).

29. The system of claim 25 comprising means for determining an indication of a security signal wherein
   the security signal indicates a secure mode of operation if the fault is determined not to have occurred and
   the security signal indicates a non-secure mode of operation if the fault is determined to have occurred.

30. The system of claim 25 wherein access to memory comprises limited access to secure memory if the fault is determined to have occurred.

31. The system of claim 25 wherein booting the integrated circuit is unaffected by the fault occurrence determination.

32. The system of claim 25 wherein the integrated circuit comprises a system-on-chip.

33. A computer program product residing on a processor-readable non-transitory storage medium and comprising processor-readable instructions executable by one or more processors to:
   cause circuitry to sample a value of each of a plurality of one-time programmable (OTP) memory arrays;
   cause a comparison logic block to
      compare the sampled value of each OTP memory array of the plurality of OTP memory arrays with the sampled value of each other OTP memory array of the plurality of OTP memory arrays and an unprogrammed OTP memory array value, wherein the unprogrammed OTP memory array value corresponds to n bits all of a same logic value associated with an as-manufactured OTP memory array, n being a number of memory devices in each of the plurality of OTP memory arrays, and determine if the sampled value of each OTP memory array is equal to the sampled value of each other OTP memory array, wherein the processor-readable instructions cause the comparison logic block to determine the fault to have occurred if the sampled value of each OTP memory array is equal to the sampled value of each other OTP memory array and the sampled value of each OTP memory array is equal to the unprogrammed OTP memory array value; and
   operate the integrated circuit with access to memory determined by the fault occurrence determination.

34. The computer program product of claim 33 further comprising processor-readable instructions to cause the comparison logic block to
   determine the fault to have occurred if the sampled value of each OTP memory array is not equal to the sampled value of each other OTP memory array; and
   determine the fault not to have occurred if the sampled value of each OTP memory array is equal to the sampled value of each other OTP memory array and the sampled value of each OTP memory array is not equal to the unprogrammed OTP memory array value.

35. The computer program product of claim 33 wherein the unprogrammed OTP memory array value is zero.

36. The computer program product of claim 33 wherein the unprogrammed OTP memory array value is ($2^n-1$).

37. The computer program product of claim 33 comprising processor-readable instructions to cause the comparison logic block to determine an indication of a security signal wherein
   the security signal indicates a secure mode of operation if the fault is determined not to have occurred and
   the security signal indicates a non-secure mode of operation if the fault occurrence is determined to have occurred.

38. The computer program product of claim 33 wherein access to memory comprises limiting access to secure memory if the fault is determined to have occurred.

39. The computer program product of claim 33 wherein the integrated circuit is booted by routines unaffected by the fault occurrence determination.

40. The computer program product of claim 33 wherein the integrated circuit comprises a system-on-chip.

* * * * *